United States Patent
Su et al.

(10) Patent No.: US 6,898,162 B2
(45) Date of Patent: May 24, 2005

(54) METHOD AND RELATED APPARATUS FOR STORING PROGRAM CODE AND OPTIMIZED POWER CALIBRATION DATA IN THE SAME NON-VOLATILE MEMORY

(75) Inventors: Wei-Ming Su, Taipei (TW); Hao-Kuen Su, Taipei Hsien (TW)

(73) Assignee: Via Optical Solutions, Inc., Hsin-Tien (TW)

( * ) Notice: Subject to any disclaimer, the term of this patent is extended or adjusted under 35 U.S.C. 154(b) by 287 days.

(21) Appl. No.: 10/064,763

(22) Filed: Aug. 14, 2002

(65) Prior Publication Data

US 2003/0193863 A1 Oct. 16, 2003

(30) Foreign Application Priority Data

Apr. 15, 2002 (TW) ........................................ 91107656 A

(51) Int. Cl.⁷ ................................................ G11B 5/09
(52) U.S. Cl. .................................... 369/47.5; 369/53.26
(58) Field of Search ........................... 369/47.5, 47.51, 369/47.52, 47.53, 47.55, 53.22, 53.26, 53.27, 53.37, 116

(56) References Cited

U.S. PATENT DOCUMENTS

| | | | | |
|---|---|---|---|---|
| 5,274,622 A | * | 12/1993 | Kono | 369/116 |
| 5,392,273 A | * | 2/1995 | Masaki et al. | 369/106 |
| 5,604,757 A | * | 2/1997 | Liang et al. | 372/38.04 |
| 6,552,981 B2 | * | 4/2003 | Kim | 369/47.51 |
| 6,563,775 B2 | * | 5/2003 | Sato | 369/47.53 |
| 6,577,570 B2 | * | 6/2003 | Lee et al. | 369/47.53 |
| 2002/0001270 A1 | | 1/2002 | Fukuchi et al. | |

* cited by examiner

Primary Examiner—Paul W. Huber
(74) Attorney, Agent, or Firm—Winston Hsu

(57) ABSTRACT

A method and related apparatus for storing program code and optimized power calibration (OPC) data in the same non-volatile memory is provided. The method is used for accessing OPC data from an optical discrecorder. The optical disc recorder is capable of obtaining OPC data of an optical disc by executing an optimized power calibrating process so as to record data onto the optical disc. The optical disc recorder has a first memory with a program code being stored therein and a second memory. The method includes registering the program code in the second memory, and writing the OPC data of the optical disc to the first memory according to the program code registered in the second memory.

16 Claims, 4 Drawing Sheets

METHOD AND RELATED APPARATUS FOR STORING PROGRAM CODE AND OPTIMIZED POWER CALIBRATION DATA IN THE SAME NON-VOLATILE MEMORY

BACKGROUND OF INVENTION

1. Field of the Invention

The present invention relates to a method for accessing data from a optical disc recorder and related apparatus, and more particularly, to a method for storing program codes and optimized power calibration data into the same non-volatile memory of the optical disc recorder.

2. Description of the Prior Art

Optical discs have many advantages, such as low-cost and compact-size, and have become a most popular storage media in recent years.

Data cannot be recorded onto an optical disc without the help of an optical disc recorder. Please refer to FIG. 1, which is a functional block diagram of a prior art optical disc recorder 10. The optical disc recorder 10 is a compact disc recorder or a digital versatile disc recorder. The optical disc recorder 10 comprises a motor 14B for spinning a optical disc 12 that is placed on top of the motor 14B, a controller 16 for managing the optical disc recorder 10, a volatile random access memory (RAM) 18 for registering data, and a programmable non-volatile flash memory 20B with a program code 22 therein. The controller 16 manages the optical disc recorder 10 according to the program code 22 and registers the data that needs to be registered into the RAM 18. The optical disc recorder 10 also comprises an optical module 14A for generating laser beams and for projecting the laser beams onto the optical disc 12. The optical module 14A also generates corresponding signals by detecting light reflected by the optical disc 12 and then transmits the signals to the controller 16. After analyzing the signals, the controller 16 adjusts the rotational speed of the motor 14B according to a predetermined algorithm of the program code 22. Furthermore, the controller 16 controls the optical module 14A to record data into the optical disc 12 by emitting laser beams with a predetermined power according to another algorithm of the program code 22.

Because optical discs manufactured by different companies have different physical and optical characteristics, the optical module 14A needs to adjust the laser power to record data onto different optical discs. The controller 16 is also capable of controlling the optical module 14A to execute an optimized power calibration (OPC) process to determine an appropriate laser power for the optical disc 12. The OPC process can obtain an OPC data for each optical disc. Optical discs manufactured by different companies correspond to different laser powers, and thus different OPC data. On the other hand, each optical disc manufacturer stores corresponding information, such as optical disc type and company code, onto the optical discs as an identification code. For example, the optical disc 12 has an identification code 28. The controller 16 can also obtain information about a optical disc from its identification code.

For storing the OPC data of each type of optical disc, the optical disc recorder 10 also comprises a read only memory (ROM) 20A. The ROM 20A comprises an information table 24, and the information table 24 comprises a plurality of entries 26A, 26B, and 26C. As shown in the information table 24, a plurality of identification codes T1, T2, and T3 correspond to a plurality of OPC data OPCp1, OPCp2, and OPCp3.

Please refer to FIG. 2. FIG. 2 is a flowchart illustrating an OPC data accessing process 100 according to the prior art. The OPC data accessing process 100 comprises following steps:

Step 102: Start;

(The controller 16 executes the process 100 to obtain the OPC data of the optical disc 12 before the optical disc recorder 10 records data onto the optical disc 12.)

Step 104: Read an identification code;

(The controller 16 controls the optical module 14A to read the identification code 28 of the optical disc 12.)

Step 106: Determine whether the identification code 28 is identical to any identification code stored in the ROM 20A;

(In FIG. 1, three identification codes T1 to T3 are stored in the ROM 20A. The controller 16 will compare the identification code 28 of the optical disc 12 with the codes T1 through T3 one by one. If the identification code 28 matches one of these three codes T1 to T3, the ROM 20A already contains the OPC data of the optical disc 12. Go to Step 108. On the contrary, go to Step 110 to obtain an OPC data.)

Step 108: Read OPC data from the ROM 20A.

(The controller 16 controls the optical module 14A with an optimized power according to the OPC data to record data onto the optical disc 12. For example, if the identification code 28 is identical to the identification code T2, the controller 16 controls the optical module 14A with an optimized power according to the OPC data OPCp2 read from the ROM 20A to record data onto the optical disc 12. Because recording data onto a optical disc usually suffers from environmental fluctuations, the OPC data OPCp2 can be used to further determine a more precise OPC data for the optical disc 12.)

Step 110: Execute an OPC process;

(The controller 16 controls the optical module 14A to execute an OPC process to obtain the OPC data of the optical disc 12. Usually, an OPC process will be performed on a predetermined area of the optical disc 12. Because an OPC process is well known by those skilled in this art, no detailed description is provided here.) Step 112: Store the OPC data corresponding to the identification code 28 and the identification code 28 itself in the ROM 20A; (The number of entries of the ROM 20A is incremented by one, as the identification code 28 and the corresponding new OPC data are stored in the ROM 20A.)

Step 114: End.

(The controller 16 has now obtained the OPC data of the optical disc 12 either from reading from the ROM 20A or from executing an OPC process. The controller 16 can control the optical module 14A with the optimized power according to the OPC data to record data onto the optical disc 12.) Whenever the optical disc recorder 10 records data to a new type optical disc, the optical module 14A will generate a new OPC data and store the new OPC data in the ROM 20A. Therefore, an extra ROM is necessary for the prior art optical disc recorder 10 to store these new OPC data. Although the optical disc recorder 10 is installed with the programmable flash memory 20B, the flash memory 20B cannot execute reading and writing functions simultaneously. That is, when the controller 16 reads the program code 22 stored in the programmable flash memory 20B, it cannot simultaneously write OPC data into the programmable flash memory 20B. The extra ROM also needs complex circuitry to function normally. So a high cost prior art optical disc recorder 10 is inevitable.

SUMMARY OF INVENTION

It is therefore a primary objective of the claimed invention to provide a method and related apparatus to simultaneously store program codes and OPC data in a flash memory.

According to the claimed invention, a method for accessing optimized power calibration (OPC) data from an optical disc recorder is disclosed. The optical disc recorder is capable of obtaining OPC data of a optical disc by executing an optimized power calibrating process so as to record data onto the optical disc. The optical disc recorder has a first memory with a program code being stored therein and a second memory. The method includes registering the program code in the second memory, and writing the OPC data of the optical disc to the first memory according to the program code registered in the second memory.

It is an advantage of the claimed invention that no extra ROM is necessary for the optical disc recorder so as to reduce the cost of the optical disc recorder.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
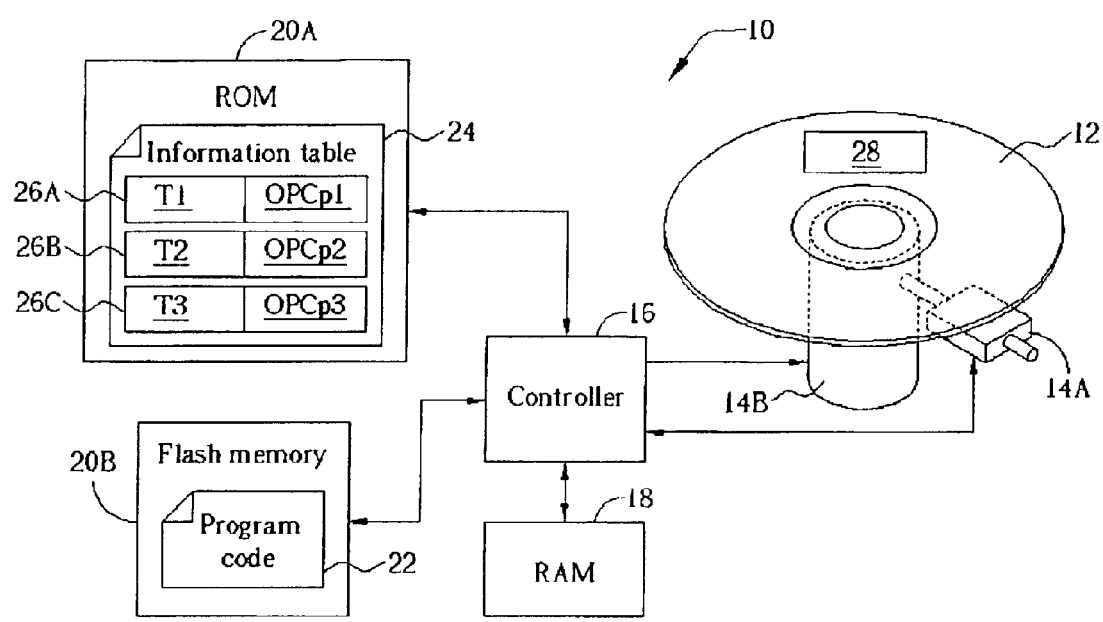
FIG. 1 is a functional block diagram of a conventional optical disc recorder.
Figure 2:
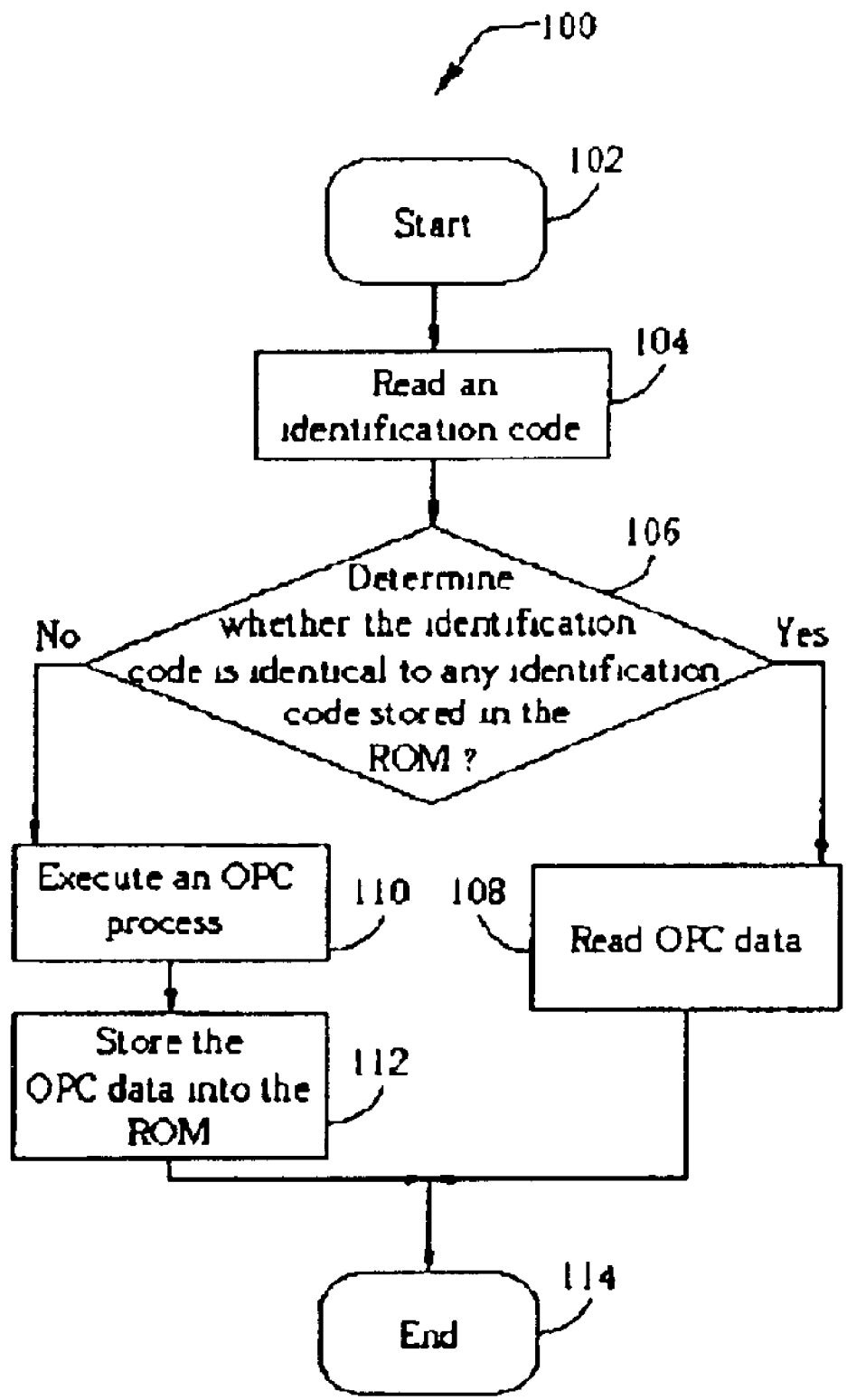
FIG. 2 is a flowchart illustrating an OPC data accessing process according to the prior art.
Figure 3:
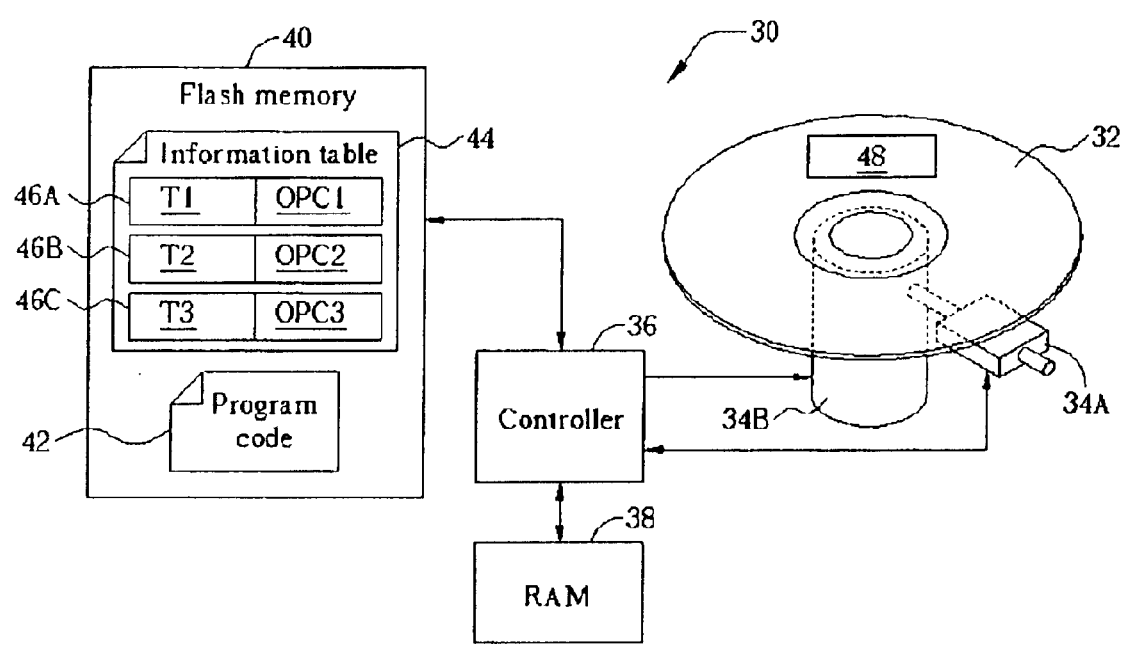
FIG. 3 is a functional block diagram of an optical disc recorder according to the present invention.

Please refer to FIG. 3, which is a functional block diagram of an optical disc recorder 30 according to the present invention. The optical disc recorder 30 comprises an optical module 34A, a motor 34B for spinning a optical disc 32, a controller 36, a RAM 38 (a second memory), and a programmable non-volatile flash memory 40 (a first memory) with a program code 42 therein. The optical module 34A generates laser beams and projects them onto the optical disc 32. The optical module 34A also generates information signals by detecting the light reflected by the optical disc 32. The controller 36 reads the program code 42 and then manages the optical disc recorder 30 according to the program code 42. The RAM 38, which can be a dynamic random access memory or a static random access memory, is a volatile memory and is used for registering the data needed for the controller 36 to function normally. For example, after analyzing the information signals generated by the optical module 34A, the controller 36 adjusts the rotational speed of the motor 34A according to a predetermined algorithm stored in the program code 42 and controls the optical module 34A to use a predetermined power to record data onto the optical disc 32.

The flash memory 40 also comprises an information table 44. The information table 44 comprises a plurality of entries 46A, 46B, and 46C. As shown in FIG. 3, a plurality of identification codes T1, T2, T3 respectively correspond to a plurality of optimized power calibration (OPC) data OPC1, OPC2, and OPC3. The optical disc 32 also has an identification code 48. As mentioned previously, optical discs having different identification codes have different physical and optical characteristics, and consequently different OPC data. Contrary to the prior art, the present invention stores the OPC data of the optical discs along with the program code 42 in the programmable non-volatile flash memory 40.

Figure 4:
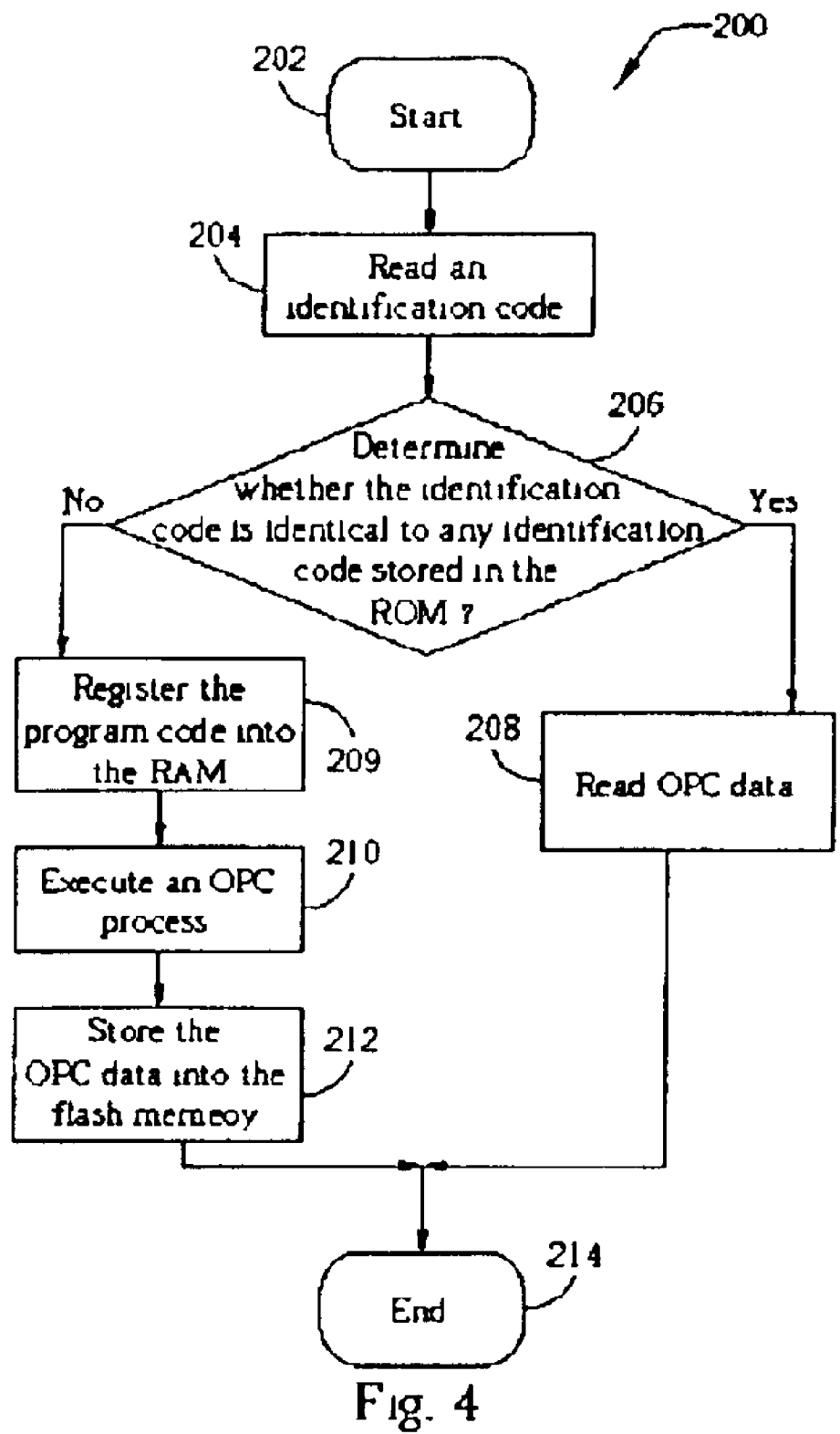
FIG. 4 is a flowchart illustrating an OPC data accessing process according to the present invention.

Please refer to FIG. 4. FIG. 4 is a flowchart illustrating an OPC data accessing process 200 according to the present invention. The OPC data accessing process 200 comprises following steps:

Step 202: Start;

(The controller 36 executes process 200 to obtain the OPC data of the optical disc 32 before the optical disc recorder 30 records data onto the optical disc 32.)

Step 204: Read an identification code;

(The controller 36 controls the optical module 34A to read the identification code 48 of the optical disc 32.)

Step 206: Determine whether the identification code 48 is identical to any identification code stored in the flash memory 40;

(In FIG. 3, three identification codes T1 through T3 are stored in the flash memory 40. The controller 36 will compare the identification code 48 of the optical disc 32 with the codes T1 through T3 one by one. If the identification code 48 matches one of the three codes T1 to T3, the flash memory 40 already contains the OPC data of the optical disc 32. Go to Step 208. On the contrary, go to Step 209 to obtain an OPC data.)

Step 208: Read OPC data, corresponding to the identification code 48, stored in the flash memory 40.

Step 209: Register the program code 42 into the RAM 38;

(Since no identification code in the flash memory 40 matches with the identification code 48 of the optical disc 32, the optical disc recorder 30 needs to execute an OPC process to obtain the corresponding OPC data of the optical disc 32. Before the OPC process is executed, the program code 42 will be stored in the RAM 38, then the controller 36 reads the program code 42 from the RAM 38 rather than from the flash memory 40.)

Step 210: Execute an OPC process;

(The controller 36 controls the optical module 34A to execute an OPC process to obtain corresponding OPC data. The OPC data is registered in the RAM 38.)

Step 212: Store the OPC data corresponding to the identification code 48 and the identification code 48 itself in the flash memory 40;

(The controller 36 stores the OPC data and the identification code 48 in the flash memory according to the program code 42 registered in the RAM 38. The number of the entries of the information table 44 is incremented by one, as the identification code 48 and the corresponding new OPC data are stored in the flash memory 40.)

Step 214: End.

(The controller 36 has now obtained the OPC data of the optical disc 32 either from reading from the flash memory 40 or from executing an OPC process. The controller 36 can control the optical module 34A with the optimized power according to the OPC data to record data onto the optical disc 32. The controller 36 can then read the program code 42 from the flash memory 40 again.) In contrast to the prior art, the present invention provides a method and related apparatus for registering the program code 42 in the RAM 38. The controller 36 stores the OPC data of the optical disc 32 in the flash memory 40 according to the program code 42. Although the flash memory 40 cannot simultaneously execute reading and storing functions, it can store the program code 42 and the OPC data. An advantage of the present invention is that no extra ROM is necessary, and because of this, a low-cost optical disc recorder 30 is anticipated.

Following the detailed description of the present invention above, those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for accessing optimized power calibration (OPC) data from an optical disc recorder managed according to a program code, which is stored in a first memory; the optical disc recorder being capable of obtaining OPC data of an optical disc by executing an optimized power calibrating process;

the method comprising:
registering the program code in a second memory; and
controlling the functionalities of the optical disc recorder according to the program code registered in the second memory and then writing the OPC data of the optical disc to the first memory.

2. The method of claim 1 wherein the optical disc further comprises an identification code, the method further comprising:
reading the identification code of the optical disc; and
registering the program code in the second memory executing the power calibrating process to obtain new OPC data, and writing the new OPC data to the first memory according to the program code registered in the second memory when the identification code of the optical disc is different from an original identification code.

3. The method of claim 2 further comprising recording data onto the optical disc according to original OPC data corresponding to the original identification code when the identification code of the optical disc is identical to the original identification code.

4. The method of claim 3 wherein the original OPC data are stored in the first memory.

5. The method of claim 2 wherein the original identification code is stored in the first memory.

6. The method of claim 1 further comprising recording data onto the optical disc according to the OPC data.

7. The method of claim 1 wherein the first memory is a flash memory and the second memory is a random access memory.

8. The method of claim 1 wherein the optical disc is a compact disc (CD) or a digital versatile disc (DVD).

9. A controller for reading optimized power calibration (OPC) data of an optical disc recorder in a optical disc recorder, the controller comprising:
a first memory stored with a program code for controlling functionalities of the optical disc recorder and a plurality of identification codes for, each identification code being corresponding to an OPC data;
a second memory for registering the program code; and
a control circuit for controlling the functionalities of the optical disc recorder according to the program code;
wherein the control circuit registers the program code into the second memory and writes the OPC data to the first memory according to the program code registered in the second memory.

10. The controller of claim 9 wherein the control circuit is capable of controlling the optical disc recorder to read an identification code of an optical disc; the control circuit registering the program code in the second memory, controlling the optical disc ecorder to execute the optimized power calibrating process to obtain new OPC data, and writing the new OPC data to the first memory according to the program code registered in the second memory when the identification code is different from an original identification code.

11. The method of claim 10 wherein the control circuit controls the optical disc recorder to record data onto the optical disc according to an original OPC data corresponding to the original identification code when the identification code is identical to the original identification code.

12. The method of claim 11 wherein the original OPC data are stored in the first memory.

13. The method of claim 10 wherein the original identification code is stored in the first memory.

14. The method of claim 9 wherein the first memory is a flash memory and the second memory is a random access memory.

15. A method for reading OPC data of a optical disc by using a optical disc recorder comprising:
reading an identification code of the optical disc;
comparing the identification code with an original identification code stored in a first memory and executing an optimized power calibrating process according to the identification code if the identification code being identical to the original identification code;
registering a program code of the optical disc recorder into a second memory and controlling functionalities of the optical disc recorder according to the program code if the identification code being different from the original identification code;
the optical disc recorder executing the optimized power calibrating process to obtain the OPC data of the optical disc; and
controlling the optical disc recorder according to the program code and storing the OPC data into the first memory.

16. The method of claim 15 wherein the first memory is a flash memory and the second memory is a random access memory.

* * * * *